C. DAY, G. E. WINDELER & P. GRANT.

INTERNAL COMBUSTION ENGINE.

Reissued Sept. 18, 1917. APPLICATION FILED JULY 13, 1917. 14,359.

3 SHEETS—SHEET 1.

Inventors:
Charles Day,
George Edward Windeler
& Peter Grant,
by: [signature]
Their Attorney.

C. DAY, G. E. WINDELER & P. GRANT.

INTERNAL COMBUSTION ENGINE.

Reissued Sept. 18, 1917.

APPLICATION FILED JULY 13, 1917.

14,359.

3 SHEETS—SHEET 2.

Inventors.
Charles Day,
George Edward Windeler,
& Peter Grant,
by: Albert G. Davis
Their Attorney.

C. DAY, G. E. WINDELER & P. GRANT.

INTERNAL COMBUSTION ENGINE.

Reissued Sept. 18, 1917.

APPLICATION FILED JULY 13, 1917.

14,359.

3 SHEETS—SHEET 3.

Inventors:
Charles Day,
George Edward Windeler,
Peter Grant,
by Albert G. Davis
Their Attorney

UNITED STATES PATENT OFFICE.

CHARLES DAY, GEORGE EDWARD WINDELER, AND PETER GRANT, OF HAZEL GROVE, NEAR STOCKPORT, ENGLAND, ASSIGNORS TO GENERAL ELECTRIC COMPANY, A CORPORATION OF NEW YORK.

INTERNAL-COMBUSTION ENGINE.

14,359. Specification of Reissued Letters Patent. Reissued Sept. 18, 1917.

Original No. 1,221,696, dated April 3, 1917, Serial No. 60,672, filed November 10, 1915. Application for reissue filed July 13, 1917. Serial No. 180,488.

*To all whom it may concern:*

Be it known that we, CHARLES DAY, GEORGE EDWARD WINDELER, and PETER GRANT, subjects of the King of Great Britain, and residents of Hazel Grove, near Stockport, county of Chester, England, have invented certain new and useful Improvements in Internal-Combustion Engines, of which the following is a specification.

The present invention relates to internal combustion engines in which liquid fuel is forced into the cylinder or cylinders by compressed air furnished by a suitable air compressor. In the operation of such engines it is desirable that the pressure of the air furnished by the compressors shall vary with the load on the engine, *i. e.* increase as the load increases and vice versa. The object of the present invention is to provide an improved arrangement for this purpose which will automatically vary the pressure in accordance with the load.

For a consideration of what we believe to be novel and our invention, attention is directed to the following specification and claims appended thereto.

Figure 1:
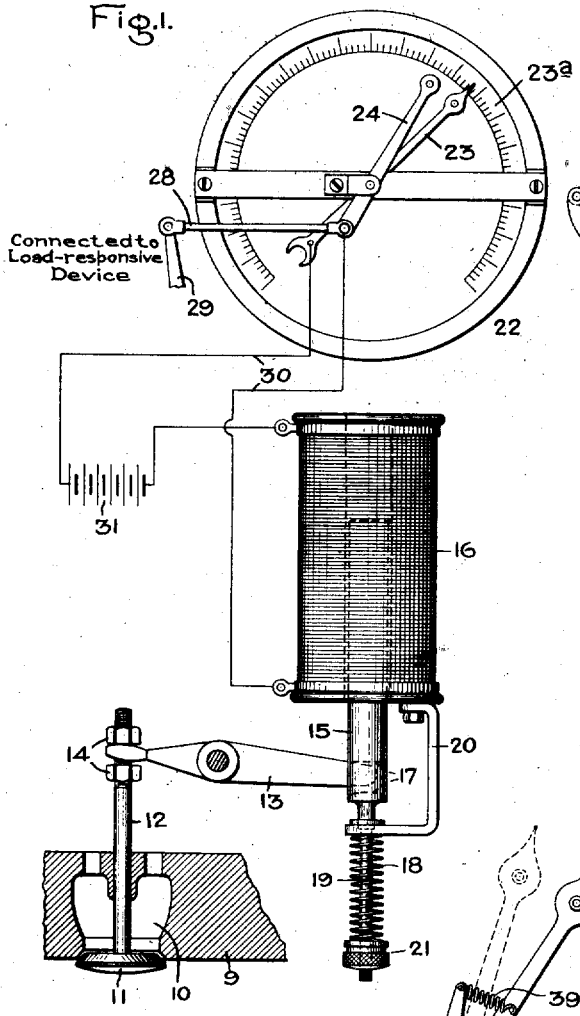
Figure 3:
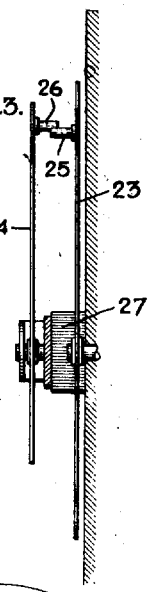
Figure 2:
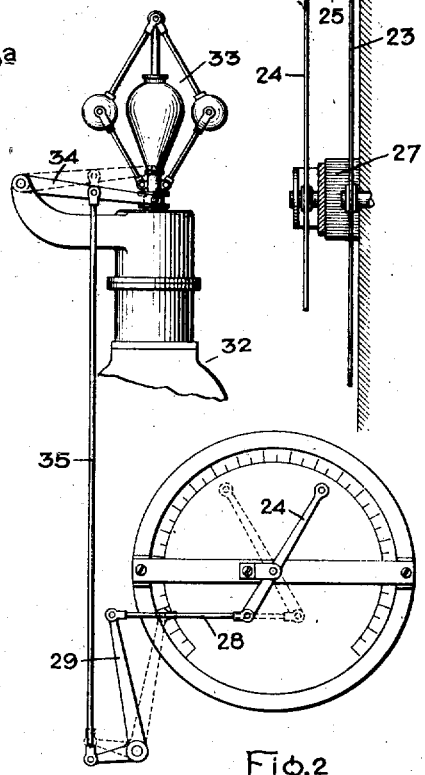
Figure 4:
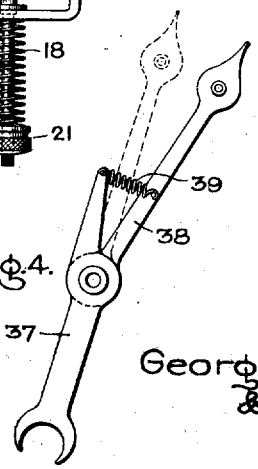
Figure 5:
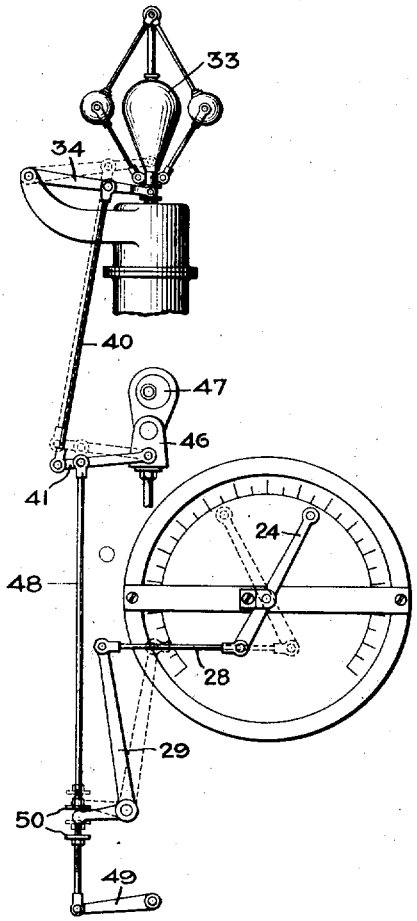
Figure 6:
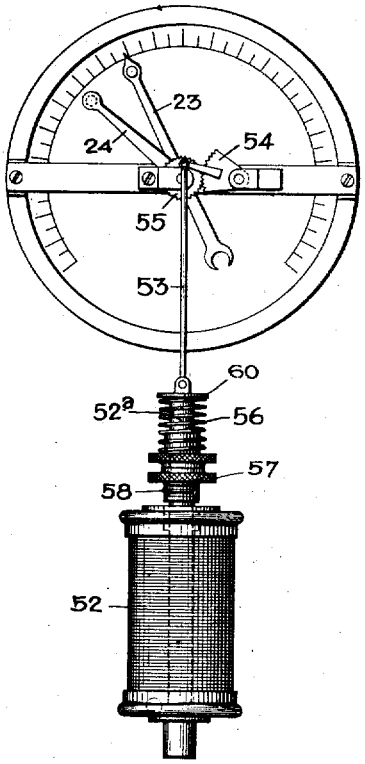

In the accompanying drawing Figure 1 is a diagrammatic view of an embodiment of our invention; Fig. 2 is a diagrammatic view illustrating a specific arrangement of connection with a speed governor; Fig. 3 is a side elevation partly in section of the contacting indicating instrument shown in Fig. 1; Fig. 4 shows a modification of a detail of the invention; Figs. 5 and 6 illustrate modifications of certain parts of the structure going to make up the invention, and Fig. 7 shows our invention as applied to an internal combustion engine.

Figure 7:
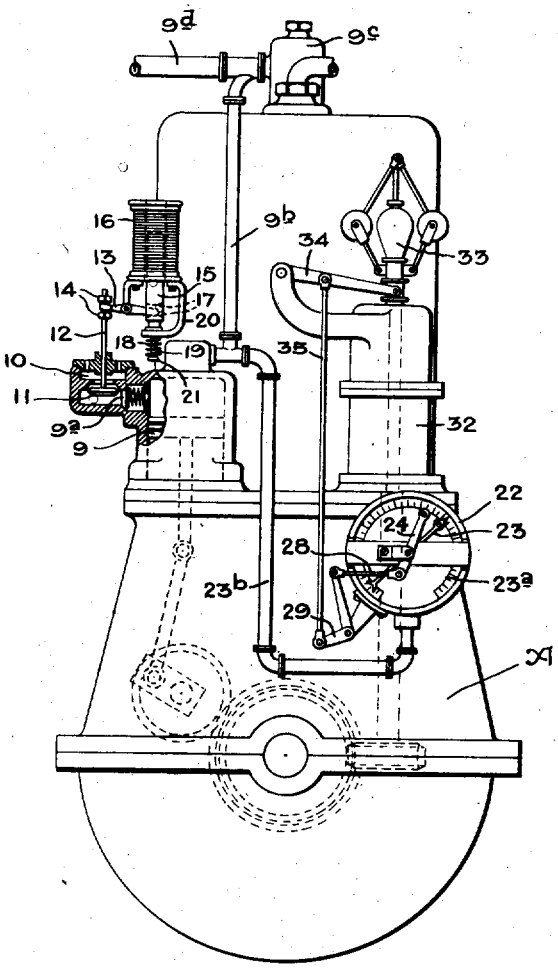

Referring to the drawing, Figs. 1 to 3 and Fig. 7, 9 indicates the casing of an air compressor and 10 its inlet, said compressor being used to supply compressed air for injecting fuel into an internal combustion engine indicated at A in Fig. 7. The compressor of which the casing 9 forms a part may be of any suitable type and comprises one or more stages as found desirable. In the present instance, it is shown as being driven from the crank shaft of the engine A. $9^a$ indicates the suction valve of the compressor 9, and $9^b$ the delivery conduit which delivers compressed air to a fuel injector $9^c$. The pipe $9^d$ may lead to a suitable storage reservoir (not shown), such an arrangement being ordinary and well known. 11 is a throttling valve controlling inlet 10 and having its stem 12 connected to a pivoted lever 13, the connection being conveniently formed by two spaced nuts 14, threaded on the end of the stem and between which one end of lever 13 is arranged. The other end of the lever is connected with the core 15 of an electromagnet 16, as by having such end project between two shoulders 17 on the core. 18 is a spring surrounding an extension 19 of the magnet core and bearing at one end against a bracket 20 and at the other against an adjustable nut 21 by which its tension may be varied. This spring biases the core of the magnet toward a position tending to close the valve 11. 22 indicates a contacting indicating instrument comprising two pointers 23 and 24 carrying contacts 25 and 26 respectively. The pointer 23 is the indicating pointer of a suitable pressure gage, $23^a$ being the scale plate thereof. This gage is connected to the delivery side of the compressor in any suitable manner, as by a pipe $23^b$ so that the pointer 23 indicates such pressure. Pointer 24 is insulated from pointer 23 as indicated at 27 and is connected through a rod 28 and lever 29 to a suitable means which is responsive to the load on the engine. The pointers 23 and 24 are connected by wires 30 to the electromagnet 16, the connections including a suitable source of electric energy as the battery 31. The pointer 23 which responds to the pressure of the compressor moves in a clockwise direction upon increase in pressure and the pointer 24 moves in a similar direction upon increase in load. The pointer 23 as will be seen from Figs. 1 and 3 is located in advance of the pointer 24, and owing to the arrangement of contacts 26 and 27 so that they move in substantially the same path with the one behind the other, the pointers will always maintain these relative positions. It will be clear that when the contacts 25 and 26 are in engagement the electromagnet 16 will be energized and the valve 11 opened. This will mean that more air will be admitted to the compressor and the delivery pressure thereof will increase.

Assuming the parts to be in a position shown in Fig. 1, if now the load further increases, the pointer 24 will be moved to bring contact 26 into engagement with contact 25 on pointer 23. This will immediately energize electromagnet 16 and open the valve 11. More air will then be admitted to the compressor and the pressure will begin to build up. As soon as the pressure of the compressor increases beyond the point which corresponds to the pressure desired for the given load, the pointer 23 will be moved away from pointer 24. This will break the circuit and permit the spring 18 to close, or nearly close, the valve 11 according to the arrangement found desirable. So long as the load remains substantially constant the pointer 24 will stand at a certain definite position and the pointer 23 will be moved back and forth into and out of contact with it, so as to maintain the pressure of the compressor at the desired value.

Referring to Figs. 2 and 7, we have illustrated one arrangement for controlling the pointer 24 in accordance with the load on the engine. In these figures 32 indicates a portion of the engine-frame and 33 a suitable type of speed governor which responds to the load on the engine. This speed governor is connected to the lever 29, here shown as a bell crank lever, by a governor lever 34 and a rod 35. In Fig. 2 the full line position shows what may be considered full load or substantially full load position and the dotted lines indicate a condition of lighter load.

With ordinary pressure gages, the indicating pointer can usually be pushed along independently of the immediate pressure responsive element of the gage, and this will, as a rule, permit the pointer 24 when moved by the speed governor, to push the pointer 23 along ahead of it. If, however, this is not considered desirable with any particular pressure gage, then the indicating pointer may be formed in two parts yieldingly connected together as shown by way of example in Fig. 4. In this figure the pointer is shown as comprising two parts 37 and 38 yieldingly connected by spring 39. Part 37 is connected with the gage tube or other movable part of the gage, while the part 38 is independently pivoted and is movable relative thereto. With this arrangement it will be obvious that the pointer 24 can move the part 38 independently of the part 37.

In Fig. 5 we have shown a modified arrangement for connecting the pointer 24 to the speed governor 33. A rod 40 is connected to the governor lever 34 at one end and at the other end is connected to a floating lever 41 which has one end connected to a part 46, which is continuously reciprocated by an eccentric 47 during the operation of the engine. Connected at a point intermediate between the ends of the floating lever 41 is a rod 48 pivoted to a supporting arm 49. Adjacent one end this rod carries spaced abutments 50 between which an end of the bell crank lever 29 projects. These abutments are adjusted a suitable distance apart so that the space between them is substantially equal to the throw of the eccentric 47. The bell crank lever 29 is arranged to be held by friction in any position in which it may be placed. When the engine is operating the rod 48 will be continuously reciprocated, the floating lever 41 pivoting on the end of rod 40 which end will be positioned by the speed governor 33. The abutments 50 will move the lever 29 so that its arm is midway between them. It will then have no effect on this lever since the throw of the eccentric will not be sufficient to move either abutment into engagement with it, and the pointer 24 will stand in the position in which it is placed by friction. In case of a change in the load, however, the speed governor will move to raise or lower, as the case may be, the rod 40, rod 48 and consequently the abutments 50. This will cause them to take up a new region of reciprocation and they will act on lever 29 to position the pointer 24 at a point corresponding to the change in load, as will be obvious. This arrangement as just described has the advantage that it takes the work of moving the pointer 24 off of the governor, the governor having merely to position the abutments 50. This results in rendering the governor more sensitive since it is not called upon to move any parts which may offer more or less resistance to movement. The pointer 24 and other parts, in an arrangement, for example, as shown in Fig. 2, may offer more resistance to movement than is desired in any particular instance.

In Fig 6 we have shown a modified arrangement adapted for use where the engine is utilized to drive an electric generator. In such cases the load on the engine will be practically proportional in quantity of current generated. We have accordingly shown the load responsive device as being in the form of an electromagnet 52 through which the current of the generator may be passed. The plunger 52ᵃ of this electromagnet is connected by a rod 53 to a segment 54 which engages a toothed member 55 fixed to the pointer 24. The pull of the magnet is controlled by a spring 56 the tension of which may be adjusted by the nut 57. This nut is threaded on to a fixed sleeve 58 supported on the magnet frame and through which the plunger 52ᵃ of the electromagnet projects. The one end of the spring surrounds the upper portion of the sleeve 58 and rests against the face of the nut 57, while the other end takes against an abutment 60 on the plunger. As will be obvious, the pointer 24 will be positioned by the electromagnet in accordance with the load on the engine. The operation of the arrangement shown in this figure is the same as that already described in connection with the other figures of the drawing and further explanation is considered unnecessary.

In accordance with the provisions of the patent statutes, we have described the principle of operation of our invention, together with the apparatus which we now consider to represent the best embodiment thereof; but we desire to have it understood that the apparatus shown is only illustrative and that the invention can be carried out by other means.

What we claim as new and desire to secure by Letters Patent of the United States, is:—

1. The combination with an internal combustion engine and a compressor for supplying air thereto for injecting fuel into it, of a valve controlling the admission of air to the inlet of the compressor, and means responsive to the load on the engine and the pressure of the air delivered by the compressor for positioning said valve.

2. The combination with an internal combustion engine and a compressor for supplying air thereto for injecting fuel into it, of a valve controlling the inlet of the compressor, a device which moves in response to the pressure on the delivery side of the compressor, a second device which moves in response to variations in the load on the engine, and means controlled by said two devices for positioning the valve.

3. The combination with an internal combustion engine and a compressor for supplying air thereto for injecting fuel into it, of a valve in the inlet of the compressor, an electromagnet for controlling the position of said valve, an electric circuit connected with said electromagnet, and means responsive to the load on the engine and the pressure on the delivery side of the compressor for opening and closing said circuit.

4. The combination with an internal combustion engine, and a compressor for supplying air thereto for injecting fuel into it, of a valve in the inlet of the compressor, and means for regulating it to vary the delivery pressure of the compressor in accordance with the load on the engine, said means comprising an electric contact which is positioned by the load on the engine, a coöperating contact which is positioned by the delivery pressure of the compressor, an electric circuit which is controlled by said contacts, and means in said circuit for opening and closing said valve.

5. The combination with an internal combustion engine having a governor, and a compressor for supplying air for injecting fuel into the engine, of a valve in the inlet of the compressor, an electroresponsive device for positioning it, an electric circuit in which said device is included, a pair of contacts movable relative to each other for opening and closing said circuit, a pressure responsive device which is moved in response to the pressure on the delivery side of the compressor for moving one of said contacts, and means connecting the other contact to said governor.

6. The combination with an internal combustion engine and a compressor for supplying air thereto for injecting fuel into it, of a valve in the inlet of the compressor and means for regulating it to vary the delivery pressure of the compressor in accordance with the load on the engine, said means comprising a pressure gage connected with the delivery side of the compressor and having an electric contact on its pointer, a second pointer carried by the gage and having a contact which coöperates with the first named contact and is positioned in accordance with the load on the engine, an electric circuit which is controlled by said contacts, and means in said circuit for opening and closing said valve.

In witness whereof, we have hereunto set our hands this 19th day of October 1915.

CHARLES DAY.
GEORGE EDWARD WINDELER.
PETER GRANT.